United States Patent
Garrett et al.

(10) Patent No.: US 11,789,209 B2
(45) Date of Patent: Oct. 17, 2023

(54) PAIR ROUTING BETWEEN UNDERSEA FIBER OPTIC CABLES

(71) Applicant: SubCom, LLC, Eatontown, NJ (US)

(72) Inventors: Lara Denise Garrett, Red Bank, NJ (US); Haifeng Li, Morganville, NJ (US); Dmitriy Kovsh, Homdel, NJ (US)

(73) Assignee: SubCom, LLC, Eatontown, NJ (US)

( * ) Notice: Subject to any disclaimer, the term of this patent is extended or adjusted under 35 U.S.C. 154(b) by 0 days.

(21) Appl. No.: 17/962,831

(22) Filed: Oct. 10, 2022

(65) Prior Publication Data

US 2023/0034669 A1 Feb. 2, 2023

Related U.S. Application Data

(63) Continuation of application No. 17/190,488, filed on Mar. 3, 2021, now Pat. No. 11,487,063.

(60) Provisional application No. 63/002,981, filed on Mar. 31, 2020.

(51) Int. Cl.
*G02B 6/35* (2006.01)
*H04Q 11/00* (2006.01)

(52) U.S. Cl.
CPC ........... *G02B 6/354* (2013.01); *G02B 6/3598* (2013.01); *H04Q 11/0005* (2013.01)

(58) Field of Classification Search
CPC .... G02B 6/654; G02B 6/3598; G02B 6/4427; G02B 6/506; H04Q 11/0005; H04Q 11/0062; H04Q 2011/0024; H04Q 2011/0039; H04Q 2011/0073; H04Q 2011/0094; H04Q 2011/0007; H04J 14/0267; H04J 14/0275; H04J 14/0212; H02G 15/14; H02G 1/10; H01R 4/66; H04B 10/03; H04B 10/25; H04B 10/27; H04B 10/038
See application file for complete search history.

(56) References Cited

U.S. PATENT DOCUMENTS

| | | | |
|---|---|---|---|
| 6,249,620 B1 | 6/2001 | Simeonidou et al. | |
| 6,922,530 B1 | 7/2005 | Kauffeldt et al. | |
| 6,931,175 B2 | 8/2005 | Bock et al. | |
| 7,326,916 B2 * | 2/2008 | Sugiyama | H04B 10/032 250/227.24 |
| 8,750,707 B2 * | 6/2014 | Sabet | H04L 63/083 380/263 |
| 9,544,086 B2 * | 1/2017 | Inoue | H04B 10/03 |
| 10,110,321 B2 * | 10/2018 | Muth | H04B 3/44 |
| 10,230,456 B2 * | 3/2019 | Thomas | H04J 14/0201 |
| 10,461,852 B1 * | 10/2019 | Grubb | H04B 10/07955 |
| 10,659,155 B2 * | 5/2020 | Grubb | H04B 10/07955 |
| 10,771,179 B1 | 9/2020 | Marcenac | |
| 10,866,364 B1 | 12/2020 | Jones et al. | |
| 11,054,599 B2 | 7/2021 | Garrett et al. | |
| 11,087,902 B2 * | 8/2021 | Garrett | H01B 9/005 |

(Continued)

*Primary Examiner* — Andrew Jordan
(74) *Attorney, Agent, or Firm* — KDW Firm PLLC

(57) ABSTRACT

An undersea fiber optic cable routing architecture including a branching unit coupled to three trunk cables capable of switching individual fibers in each fiber pair within a cable to either of the other two cables. The branching unit comprises a plurality of optical switches and a controller for receiving remote command signals and configuring the optical switches in accordance with the remote command signals.

20 Claims, 9 Drawing Sheets

(56) References Cited

U.S. PATENT DOCUMENTS

| | | | |
|---|---|---|---|
| 11,347,004 B2 * | 5/2022 | Kardos | G02B 6/29383 |
| 11,483,077 B2 * | 10/2022 | Garrett | H04B 10/801 |
| 11,487,063 B2 * | 11/2022 | Garrett | H04Q 11/0005 |
| 11,531,175 B2 * | 12/2022 | Mendez | G02B 6/506 |
| 2001/0040710 A1 | 11/2001 | Sharratt et al. | |
| 2010/0290786 A1 | 11/2010 | Abbott | |
| 2011/0311216 A1 | 12/2011 | Inoue | |
| 2012/0177362 A1 | 7/2012 | Zhang et al. | |
| 2012/0243879 A1 | 9/2012 | Nashimoto et al. | |
| 2012/0263476 A1 * | 10/2012 | Sabet | H04B 10/85 398/104 |
| 2013/0259055 A1 | 10/2013 | Ji et al. | |
| 2014/0037284 A1 | 2/2014 | Aida | |
| 2014/0099098 A1 | 4/2014 | Wang et al. | |
| 2015/0200743 A1 | 7/2015 | Kamalov | |
| 2015/0295674 A1 * | 10/2015 | Inoue | H04J 14/0215 398/83 |
| 2016/0308638 A1 | 10/2016 | Zhang | |
| 2018/0083697 A1 * | 3/2018 | Thomas | H04B 10/032 |
| 2018/0269990 A1 * | 9/2018 | Muth | H04B 3/44 |
| 2020/0033542 A1 | 1/2020 | Garrett et al. | |
| 2020/0052788 A1 * | 2/2020 | Grubb | H04B 10/07955 |
| 2020/0322055 A1 * | 10/2020 | Jones | H04B 10/29 |
| 2020/0371295 A1 | 11/2020 | Jones et al. | |
| 2020/0400889 A1 * | 12/2020 | Kardos | H04J 14/0201 |
| 2020/0402685 A1 * | 12/2020 | Garrett | H02G 9/02 |
| 2021/0175699 A1 * | 6/2021 | Garrett | H02G 1/10 |
| 2021/0302660 A1 | 9/2021 | Garrett et al. | |
| 2021/0302678 A1 | 9/2021 | Garrett et al. | |
| 2021/0373264 A1 * | 12/2021 | Mendez | G02B 6/506 |
| 2021/0391925 A1 * | 12/2021 | Garrett | H04B 10/806 |
| 2022/0113471 A1 | 4/2022 | Aida | |
| 2022/0252818 A1 * | 8/2022 | Yano | G02B 6/4472 |
| 2022/0283397 A1 * | 9/2022 | Spalding | G02B 6/4494 |
| 2022/0312087 A1 * | 9/2022 | Takahashi | H04B 10/27 |
| 2023/0034669 A1 * | 2/2023 | Garrett | H04J 14/0275 |

* cited by examiner

PAIR ROUTING BETWEEN UNDERSEA FIBER OPTIC CABLES

CROSS-REFERENCE TO RELATED APPLICATIONS

This application claims priority to and is a continuation of U.S. patent application Ser. No. 17/190,488, filed on Mar. 3, 2021, which claims priority to U.S. Provisional Patent Application No. 63/002,981, filed on Mar. 31, 2020, the entire contents of which are hereby incorporated herein by reference.

TECHNICAL FIELD

This disclosure relates generally to the field of undersea communication networks and relates more particularly to submarine cable branching nodes with fiber pair switching.

BACKGROUND

Submarine optical cables are laid on the seabed or ocean floor between land-based terminals to carry optical signals across long stretches of ocean and sea. The optical cables typically include several optical fiber pairs and other components such as strengthening members, a power conductor, an electrical insulator and a protective shield. The optical fibers may be single core/mode fibers or multi-mode/core fibers. The first fiber of a fiber pair may be coupled in the system for communicating signals in a first direction on the cable and the second fiber of the fiber pair may be configured for communicating signals in a second direction, opposite the first direction, on the cable to support bi-directional communications.

In a branched submarine optical communication system, a trunk cable may extend between first and second land-based trunk terminals. The trunk cable may include a number of trunk cable segments coupled between optical amplifiers for amplifying the optical signals and may have one or more branching nodes coupled thereto. Each branching unit may be connected to a branch cable that terminates in a transmitting and/or receiving land-based branch terminal. The branch cable may include a number of branch cable segments coupled between optical amplifiers for amplifying the optical signals.

BRIEF SUMMARY

In one aspect, an undersea fiber optic cable routing system is provided. The undersea fiber optic cable routing system includes a branching unit coupled to three fiber optic cables. Each fiber optic cable having a number of fiber pairs. The branching unit may include a number of switches for each fiber pair. The number of switches are configurable to enable a fiber pair from any one of the three fiber optic cables may be switched to allow routing to either of the other two cable fiber optic cables, and a controller operable to receive remote command signals and to configure the number of switches as indicated by the received remote command signal.

In another aspect, an undersea fiber optic cable routing system that includes a first undersea fiber optic cable, a second undersea fiber optic cable, and a third fiber optic cable, and a branching unit is provided. Each of the first, second and third undersea fiber optic cables includes a number of fiber pairs. The branching unit may be configured to couple to each of the first, second and third undersea fiber optic cables. The branching unit includes a first set of assignable switches, a second set of assignable switches, a third set of assignable switches, a number of optical pathways, and a controller. The first set of assignable switches may be configured to optically couple to the plurality of fiber pairs in the first undersea fiber optic cable, where each assignable switch in the first set is coupled to a respective fiber pair in the first fiber optic cable. The second set of assignable switches may be configured to optically couple to the number of fiber pairs in the second undersea fiber optic cable and the third set of assignable switches may be configured to optically couple to a third undersea fiber optic cable. Each assignable switch in the second set is coupled to a respective fiber pair in the second fiber optic cable and each assignable switch in the third set is coupled to a respective fiber pair in the third fiber optic cable. The optical pathways are coupled to respective assignable switches in each of the first set, second set and third set of assignable switches to one another. The controller may be coupled to each respective assignable switch in each of the first set, second set and third set of assignable switches, where the controller is operable to assign a respective first set assignable switch from the first set to a respective second set assignable switch and to a respective third set assignable switch.

BRIEF DESCRIPTION OF THE DRAWINGS

In the drawings, like reference characters generally refer to the same parts throughout the different views. In the following description, various embodiments of the present disclosure are described with reference to the following drawings, in which.

DETAILED DESCRIPTION

Systems, and devices in accordance with the present disclosure will now be described more fully hereinafter with reference to the accompanying drawings, where one or more embodiments are shown. The systems and devices may be embodied in many different forms and are not to be construed as being limited to the embodiments set forth herein.

Instead, these embodiments are provided so the disclosure will be thorough and complete, and will fully convey the scope of methods and devices to those skilled in the art. Each of the systems, devices, and methods disclosed herein provides one or more advantages over conventional systems, components, and methods.

Undersea cables are typically implemented with trunk and branch architectures, as described above. Typical connection architectures designate two cables as "trunk" cables, and the third cable as a "branch" cable. At a network unit, fiber switches on each trunk fiber pair are configured so that an individual trunk fiber pair either connects to, or bypasses, a corresponding set of branch fiber pairs. In the new configuration described herein, there is no trunk and branch designation.

The disclosed subject matter provides the capability to bring three trunk cables together by providing new switching architectures usable to provide for reconfigurable routing flexibility between the fiber pairs in all three cables. A new switching architecture allows any "two out of three" trunk cables to be connected, on a per fiber, per fiber pair or per group of fiber-pairs basis. Other technical features may be readily apparent to one skilled in the art from the following figures, descriptions, and claims.

The assignable switches described herein may be configured to connect any two-out-of-three fiber pairs, where one fiber pair comes from each of the three cables. The fiber pair selectivity can be provided for anywhere between one "trio" of fiber pairs (e.g. 1×1×1), up to N trios of fiber pairs (e.g., N×N×N), where N is the fiber pair count of the cable with the lowest number of fiber pairs.

Figure 1:
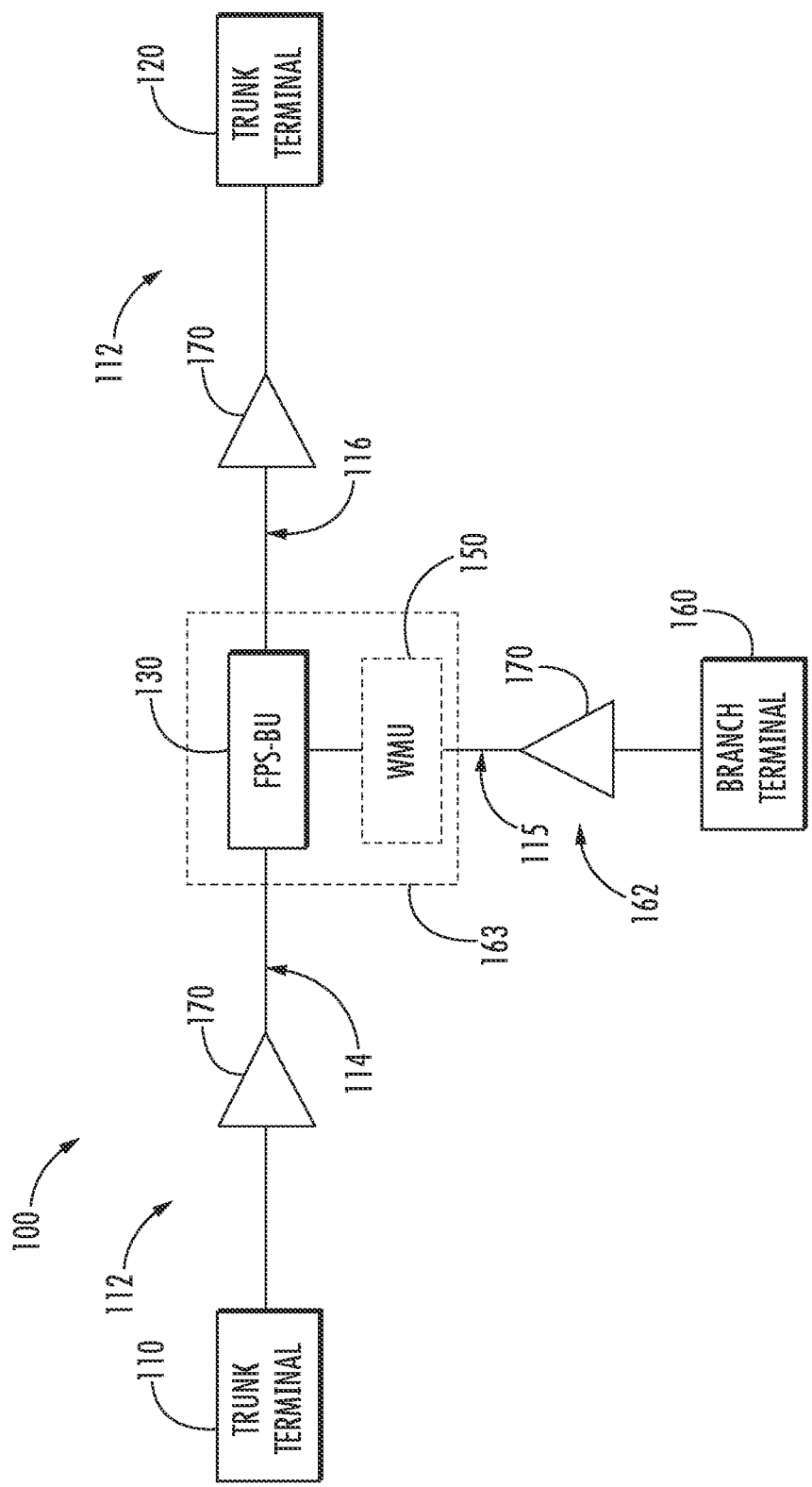
FIG. 1 is a schematic diagram illustrating an exemplary branched optical communication system

FIG. 1 illustrates an exemplary branched optical communication system 100. The system 100 has been depicted in highly-simplified form for ease of explanation. The illustrated system 100 includes land-based trunk terminals 110 and 120 coupled to a trunk cable 112, and a land-based branch terminal 160 coupled to the trunk cable 112 through a branch cable 162. In some embodiments, the system 100 may be configured as a long-haul system, e.g. having a length between at least two of the terminals of more than about 600 km, which spans a body of water, e.g. an ocean. The trunk cable 112 may thus span between beach landings.

The trunk cable 112 and the branch cables 162 may both include a plurality of optical cable segments, e.g. cable segments 114, 115, 116 for carrying optical signals, e.g. wavelength division multiplexed (WDM) optical signals. Each cable segment may include one or more sections of optical cable and one or more repeaters 170. Each section of optical cable may take a known configuration including a plurality of fiber pairs, one or more layers of strengthening members, an electrical power conductor, an insulator, and armored cover portion. The optical fiber pairs and the power conductor of the optical cable are covered and protected within the cable by the armored cover portion, members, and a protective cover.

The system 100 may therefore be configured to provide bi-directional communication of optical signals between any of the terminals 110, 120, 160. For ease of explanation, the description herein may refer to transmission from one terminal to another. It is to be understood, however, that the system 100 may be configured for bi-directional or uni-directional communication between any number of the terminals 110, 120, 160.

At least one fiber pair switching branching unit (FPS-BU) 130 may be coupled to the trunk cable between the trunk terminals 110, 120. As will be described in greater detail below, the FPS-BU 130 is configured to allow remote and selectively controllable routing of trunk cable fiber pairs to branch cable fiber pairs. In some embodiments, the FPS-BU 130 is configured to allow remote and selectively controllable routing of two or more trunk cable fiber pairs to a fewer number of branch cable fiber pairs. Although the FPS-BU 130 is illustrated as a single element in FIG. 1, it is to be understood that the functionality of the FPS-BU 130 may be integrated into a single element disposed in a single housing, or portions of the functionality may be physically separate from each other, e.g. by several kilometers or by one or more water depths to allow the elements to be retrieved from an ocean floor for repair or replacement independently of one another.

The FPS-BU 130 may be associated with an optional wavelength management unit (WMU) unit 150, configured to provide selective wavelength filtering of the signals on the branch cable fiber pairs coupled to the FPS-BU 130.

Figure 2:
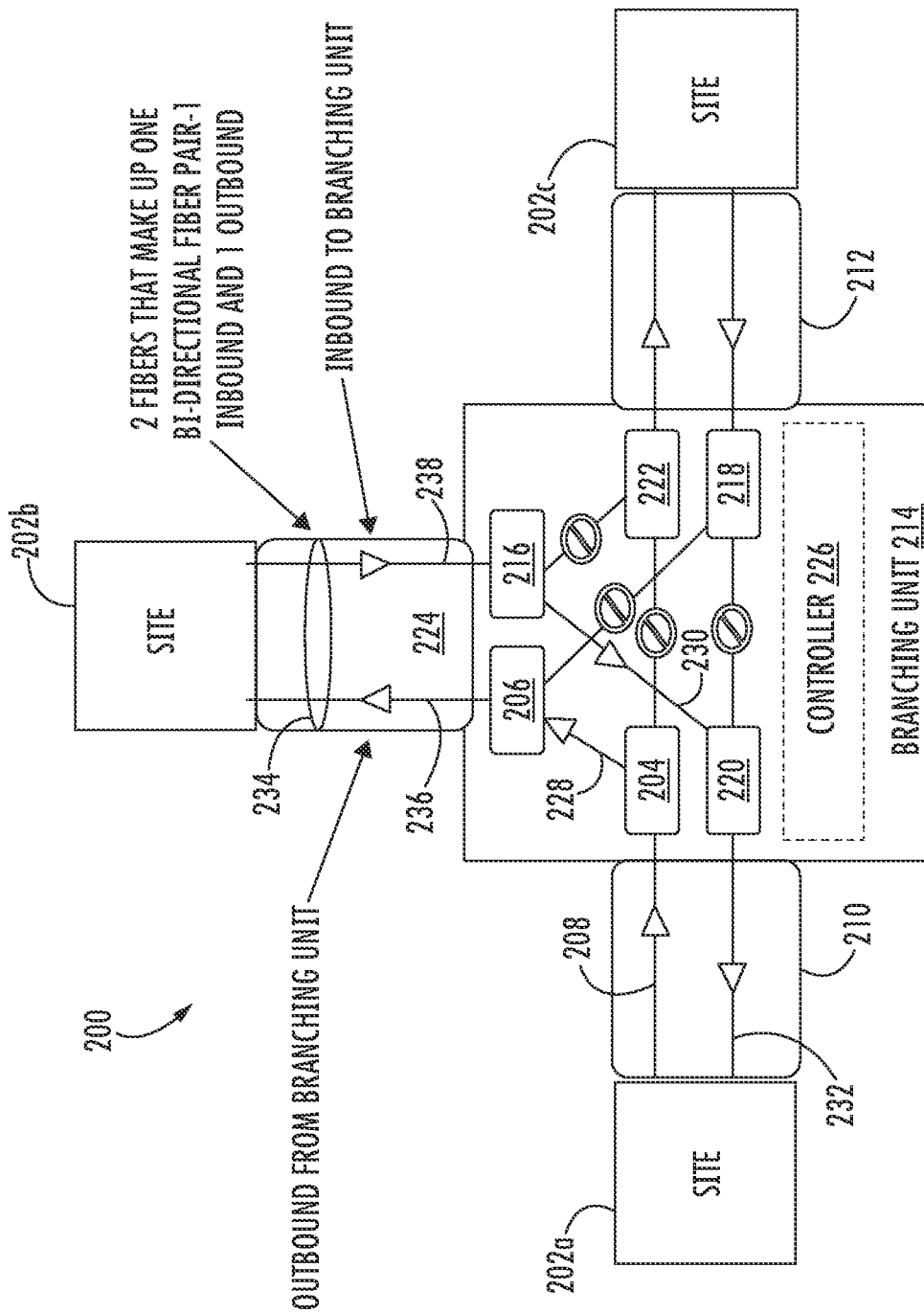
FIG. 2 is a diagram showing a branching unit between three undersea cables, with specialized fiber switching configuration for each fiber pair.

FIG. 2 shows a first embodiment showing three cables 210, 212 and 224 from three sites 202a, 202b, and 202c, respectively, connected at a branching unit 214. The three sites 202a, 202b, and 202c may output information as optical signals for transmission via the respective cables 210, 212 and 224. Each cable 210, 212 or 224 has a certain number of fiber pairs with each fiber pair having two fibers. For example, fiber pair 234 from undersea fiber optic cable 224, has one inbound fiber 238 to Site 2 202b and one outbound fiber 236 from Site 2 202b, which allows bidirectional communication between sites 202a and 202b. For example, undersea fiber optic cable 210 has a fiber pair that includes inbound fiber 208 and outbound fiber 232.

Branching Unit 214 may include a number of assignable switches 204, 206, 216, 218 220 and 222 and a number of optical pathways, such as 228 and 230, that couple the respective assignable switches to one another. The Branching Unit 214 may be configured to allow remote and selectively controllable routing of the fiber pairs in response to a remote command signal. The remote command signal for configuring the switches may be transmitted, for example, on a supervisory channel of a wavelength division multiplexed signal transmitted on anyone of the three cables 210, 212 or 224. Branch unit 214 may include a controller 226 for extracting the remote command signal from the supervisory channel and for configuring the switches in response to the remote command signal. In alternate embodiments, the remote command signal may be transmitted to branch unit 214 by any known means, including, for example, transmitting the remote command signal on a fiber of the fiber pair being switched, such as fiber 208 and fiber 232, and retrieved by the controller 226.

The FIG. 2 shows the switching of one of the fiber pairs from each cable. The embodiment of FIG. 2 is capable of routing individual fiber pairs within each cable 210, 212, or 224. The embodiment shows one fiber pair from each of the three cables to be connected through an assembly of six 1×2 optical switches. However, switches with other ratios, such as 2×2 blocking, 2×2 non-blocking, or larger ratio switches, may be used.

To change the fiber path, for example, from connecting Site 202a to Site 202c to connecting Site 202a to Site 202b, the optical switching in the branching unit 214 for both fibers must be configured by the controller 226. To establish an optical path for one fiber of the fiber pair, two out of the three switches for a fiber are configured to couple to a correct switch. For example, one "head end" switch, such as switch 204, for the inbound fiber 208 and one "selector" switch, such as switch 206, for coupling to the outbound fiber 236. Switch 206 may be a corresponding switch to switch 204 and switch 216 may be a corresponding switch to switch 220. A corresponding switch is an optical assignable switch in another cable that is matched to the direction of optical signal flow. In the example, both fibers of the fiber pair follow the same route between sites, that is, both fibers (e.g., 208 and 232 of Site 202a) in the fiber pair are switched together (e.g., using switches 204 and 220) to couple to respective fibers 236 and 238 in fiber pair 234 of cable 224). When the above described switching is completed, optical signal transfers from switches 218 and 222 of Cable 212 to switches 204 and 220 of Cable 210 are no longer enabled. Additionally, optical signal transfers from switches 218 and 222 of Cable 212 to switches 206 and 216 of cable 224 are no longer enabled. The foregoing description describes the formation of a switching triangle between switches 204, 206 and 218 of respective cables 210, 212 and 224 as well as a corresponding switching triangle for switches 220, 216 and 222.

When one undersea fiber optic cable has fewer fiber pairs than the others, the number of supported fiber pairs is limited to that number of fiber pairs. For example, if two fiber optic cables of three fiber optic cables have 16 fiber pairs and the third fiber optic cable has only six fiber pairs, then only six fiber pairs from each of the three cables may be configured in the "two-out-of-three configuration."

Figure 3:
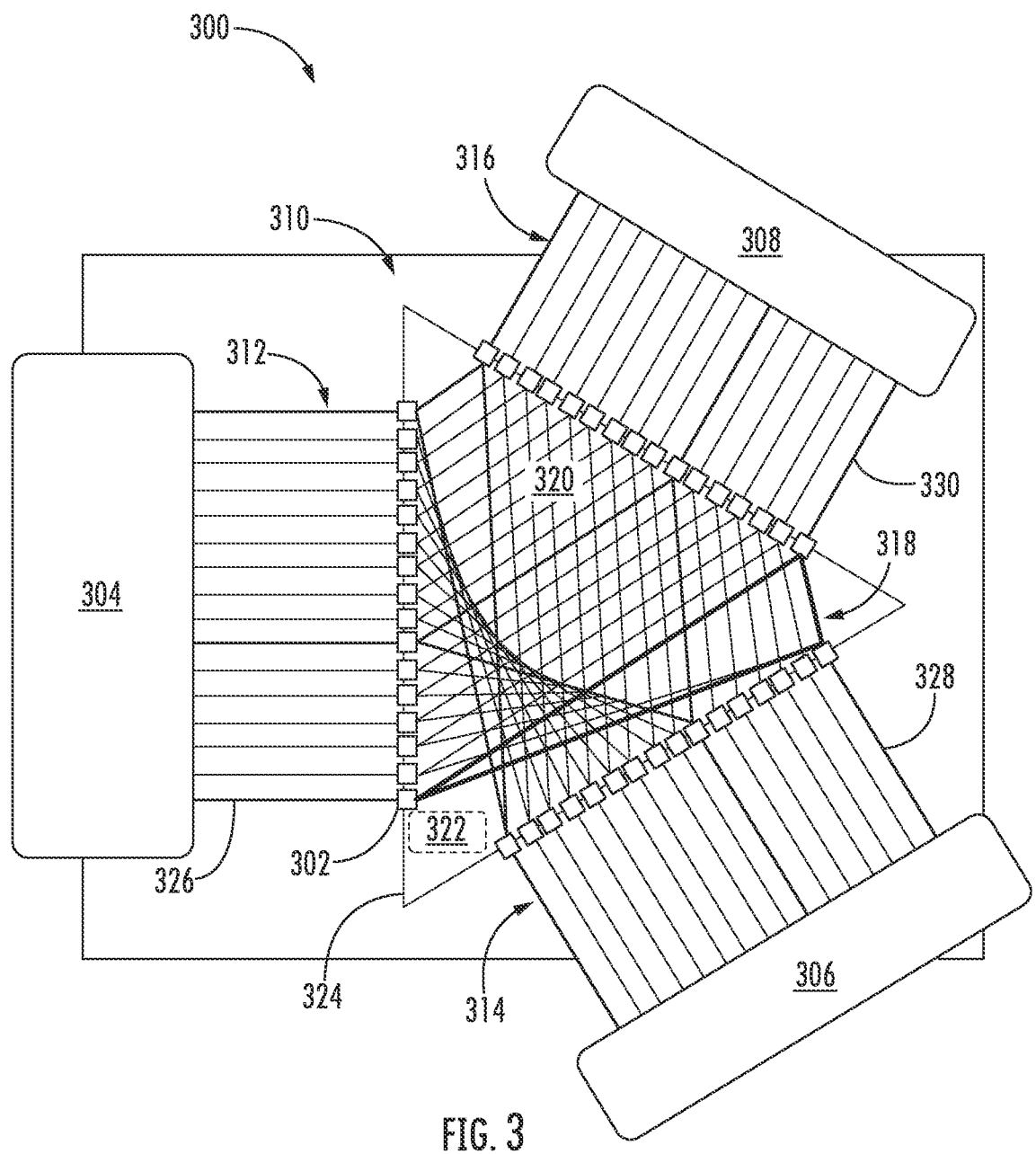
FIG. 3 is a diagram of fiber pair switching connectivity between the three sites, showing switch connections between individual fiber pairs in each cable.

FIG. 3 illustrates an expansion of the switching of individual fiber pairs, as shown in FIG. 2 to switching between three undersea fiber optic cables, each undersea fiber optic cable in FIG. 3 has 16 fiber pairs, for example. The undersea fiber optic cable routing system 300 may include sites 304, 306 and 308, undersea fiber optic cables 312, 314, and 316, and configurable branching unit 310.

The sites 304, 306 and 308 may provide optical signals (not shown) containing information that is to be transmitted to further distribution or received from another corresponding site (e.g., site 304 exchanges optical signals with site 306, and site 308 exchanges optical signals with site 304, and so on). The respective sites 304, 306, 308 may include hardware, such processors, servers, lasers, optical modulators, optical demodulators, electro-optical conversion equipment, optical amplifiers, repeaters, and the like. Like the undersea fiber optic cables 210, 212 and 224 of FIG. 2, the undersea fiber optic cables 312, 314 and 316 include a number of fiber pairs.

The undersea fiber optic cables 312, 314 and 316 may be optically coupled to the respective sites 304, 306 and 308 at a first end and coupled to the branching unit 310 at a second end.

The configurable branching unit 310 may include a number of optical switches that are assignable switches, a number of optical pathways 320, a controller 322, and a housing 324. The housing 324 is configured to protect the number of optical switches, such as the optical switch 302, the number of optical pathways 320, and the controller 322. The controller 322 may optionally be located within the housing 324 of the configurable branching unit 310.

In the example of FIG. 3, undersea fiber optic cable 312 includes 16 fiber pairs, such as fiber pair 326, which couple to an assignable switch, such as 302, of the number of assignable switches in configurable branching unit 310. While there are 16 optical assignable switches 302 for each fiber pair shown in the FIG. 3 example, there are actually 32 optical assignable switches 302, one optical assignable switch for the inbound fiber and one optical assignable switch for the outbound fiber of the 16 fiber pairs shown for each of the fiber optic cables 312, 314 and 316.

In the example configurable branching unit 310, one fiber from each of cables 312, 314 and 316 may be assigned by the controller 322 to one "switching triangle" 318 between the three cables 312, 314 and 316. FIG. 3 illustrates an example of a switching triangle 318, which is one of three switching triangle examples shown, it should be realized by one of skill in the art that a switching triangle may exist for each corresponding fiber pair from each cable 312, 314 and 316.

Switching triangle 318 represents the three possible connection paths for each group of fiber pairs (i.e., fiber pair 326 of undersea fiber optic cable 312, fiber pair 328 of undersea fiber optic cable 314 and fiber pair 330 of undersea fiber optic cable 316) in configurable branching unit 310. Only one side of the switching triangle 318 can be active at a time, forming a connection between two of the three sites. The other two sides of the switching triangle 318 are disconnected by the respective optical switches 302 at each vertex of the switching triangle 318.

The respective embodiments shown in FIG. 2 and FIG. 3 provide a novel optical switching configuration in the undersea cable environment. The branching unit 214 as well as the configurable branching unit 310 can be configured to connect two out of three sites on each fiber pair. For each fiber pair, a first site (e.g., Site 202a of FIG. 2, or Site 304 of FIG. 3) one may be connected to second site (e.g., Site 202b of FIG. 2, or Site 306 of FIG. 3), with a third site (e.g., Site 202c of FIG. 2, or Site 308 of FIG. 3) disconnected. Alternatively, the first site (e.g., Site 202a of FIG. 2, or Site 304 of FIG. 3) may be connected to the third site (e.g., Site 202c of FIG. 2, or Site 308 of FIG. 3) with the second site (e.g., Site 202b of FIG. 2, or Site 306 of FIG. 3) disconnected. In another alternative, the second site (e.g., Site 202b of FIG. 2, or Site 306 of FIG. 3) may be connected to the third site (e.g., Site 202c of FIG. 2, or Site 308 of FIG. 3) with the first site (e.g., Site 202a of FIG. 2, or Site 304 of FIG. 3) disconnected. Any "odd" numbers of leftover fiber pairs in any cable would be managed with a single fiber pair architecture, such as shown in the embodiment of FIG. 2 and FIG. 3.

Figure 4:
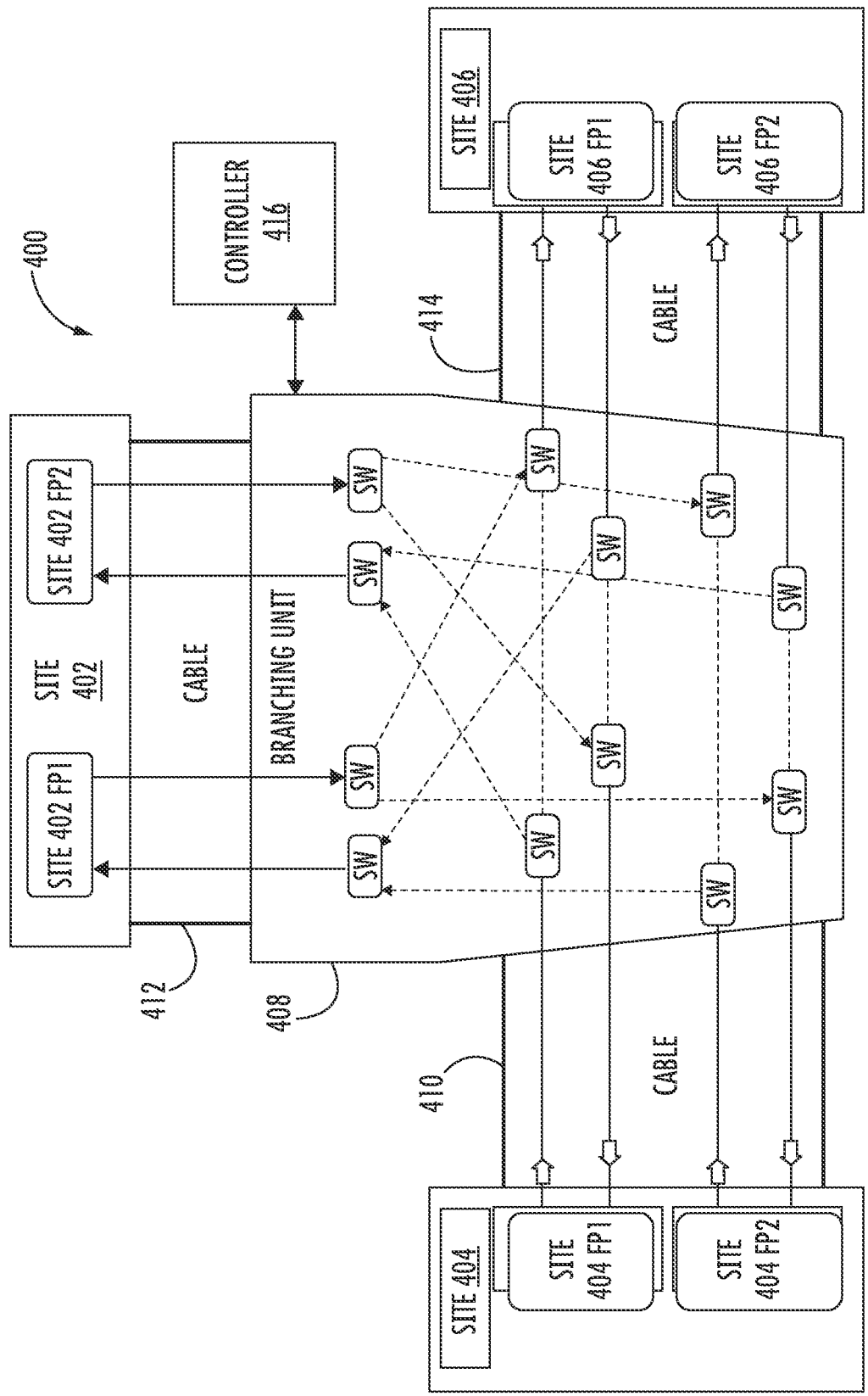
FIG. 4 is a diagram showing an alternate embodiment of the invention to link to fiber pairs in each cable together into a larger, more flexible reconfiguration group.

FIG. 4 is a diagram showing an alternate embodiment of the invention to link to fiber pairs in each cable together into a larger, more flexible reconfiguration group. In the undersea fiber optic cable routing system 400, Site 402, Site 404 and Site 406 are coupled to branching unit 408. In the example of FIG. 4, the selection group is expanded to include two fiber pairs in each respective cable 410, 412 and 414. In the FIG. 4 example, the controller 416 may have selected a group of two fiber pairs for switching. The controller 416 may be operable to designate any two fiber pairs in each cable 410, 412 and 414 as part of the same selection group. For example, a remote command signal may be received instructing the controller 416 which fiber pairs from the respective cables 410, 412 or 414, or from respective sites 404, 402 and 406, to designate as part of a selection group for switching.

In the example, a first fiber pair in Site 402 (i.e., Site 402 FP1) and a second fiber pair in Site 402 (i.e., Site 402 FP2) in cable 412 may be designated by the controller 416 as part of a selection group. Fiber pairs in respective cables 410 and 414, such as Site 404 FP1, Site 404 FP2, Site 406 FP1 and Site 406 FP2, may also be designated by the controller 416 to complete the selection group. Once the selection group is designated, the controller 416 may assign two optical assignable switches coupled to each designated fiber pair (e.g., Site 402 FP1, Site 404 FP1 and Site 406 FP1) to couple via an optical pathway (shown by the dashed lines) to one another. In the example, the two optical assignable switches coupled to each designated fiber pair (e.g., Site 402 FP1) of cable 412 may be coupled via a dedicated optical pathway to a corresponding set or duo of optical assignable switches coupled to the designated fiber pair of cable 414 (i.e., Site 406 FP1). Similarly, the two optical assignable switches coupled to each designated fiber pair (e.g., Site 406 FP1) of cable 414 may be coupled via a dedicated optical pathway to a corresponding set or duo of optical assignable switches coupled to the designated fiber pair of cable 410 (i.e., Site 406 FP1).

The embodiment shown in FIG. 4 provides additional flexibility by allowing configurations with two connected fiber pairs per selection group. For example, connecting site 402 to site 404 with two fiber pairs with site 406 disconnected; connecting site 402 to site 406 with 2 fiber pairs with site 404 disconnected; or connecting site 404 to site 406 with two fiber pairs with site 402 disconnected.

Figure 5:
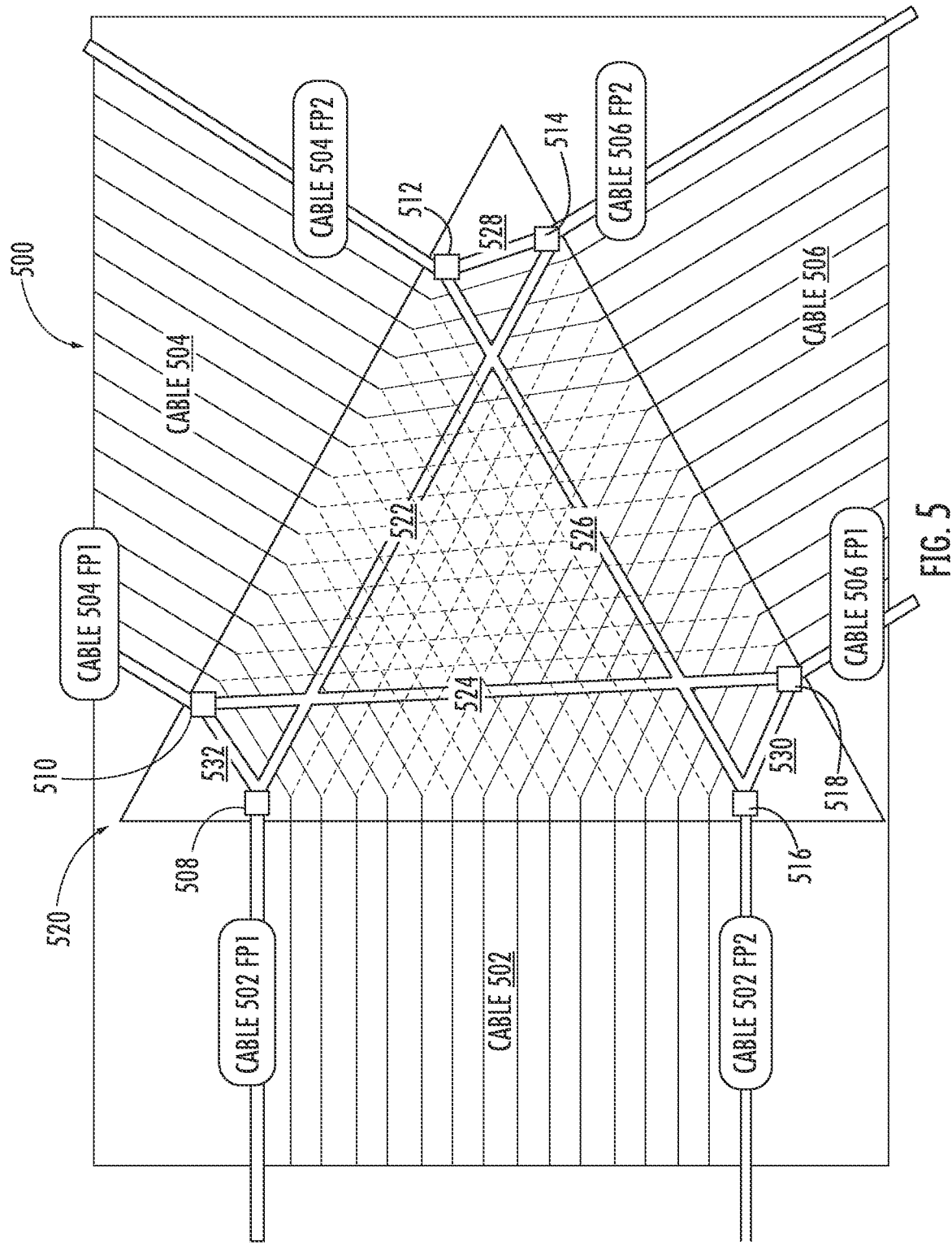
FIG. 5 is a diagram showing the linkage between two fiber pairs in each of the three cables in the switch configuration shown in FIG. 4.

FIG. 5 shows an alternative view of the linkage between two fiber pairs in each of the three cables in a switch configuration such as that shown in FIG. 4. In the example, an undersea fiber optic cable routing architecture 500 that includes cables 502, 504 and 506, and a branching unit 520. In this example, each of the cables 502, 504 and 506 include 16 fiber pairs (an inbound fiber and an outbound fiber). As in the earlier examples, the branching unit 520 has 32 respective optical assignable switches to couple to the respective inbound and outbound fibers. In this example, the controller has designated the outermost fiber pairs to be coupled to one another. The designated coupling connects cable 502 FP1-to-cable 504 FP1-to-cable 506 FP1 and cable 502 FP2-to-cable 504 FP2-to-cable 506 F2, from each respective cable 502, 504 and 506 to one another. The controller further assigns optical assignable switches to route the designated fiber pairs according to the designated coupling. For example, the controller may assign optical assignable switch 508 (of cable 502) to corresponding optical assignable switch 510 (of cable 504) and corresponding optical assignable switch 514 (of cable 506). The controller may further assign optical assignable switch 516 (of cable 502) to corresponding optical assignable switch 512 (of cable 504) and corresponding optical assignable switch 518 (of cable 506). Since each optical assignable switch includes switches to couple to each fiber of the respective fiber pairs bi-directional is enabled.

The branching unit 520 includes a number of optical pathways, such as 522, 524, 526, 528, 530 and 532 that interconnect each of the optical assignable switches 508-518. Each optical assignable switch is coupled to two optical pathways. For example, optical assignable switch 518 is optically coupled to optical assignable switch 516 via optical pathway 530 and to optical assignable switch 510 via optical pathway 524. Similarly, optical assignable switch 516 is optically coupled to optical assignable switch 512 via optical pathway 526. As in the earlier examples, only one optical pathway of the two can be active at a particular time. Based on which optical pathways are active, the optical assignable switches may be controlled to place the branching unit 520 in one of five different states.

Figure 6:
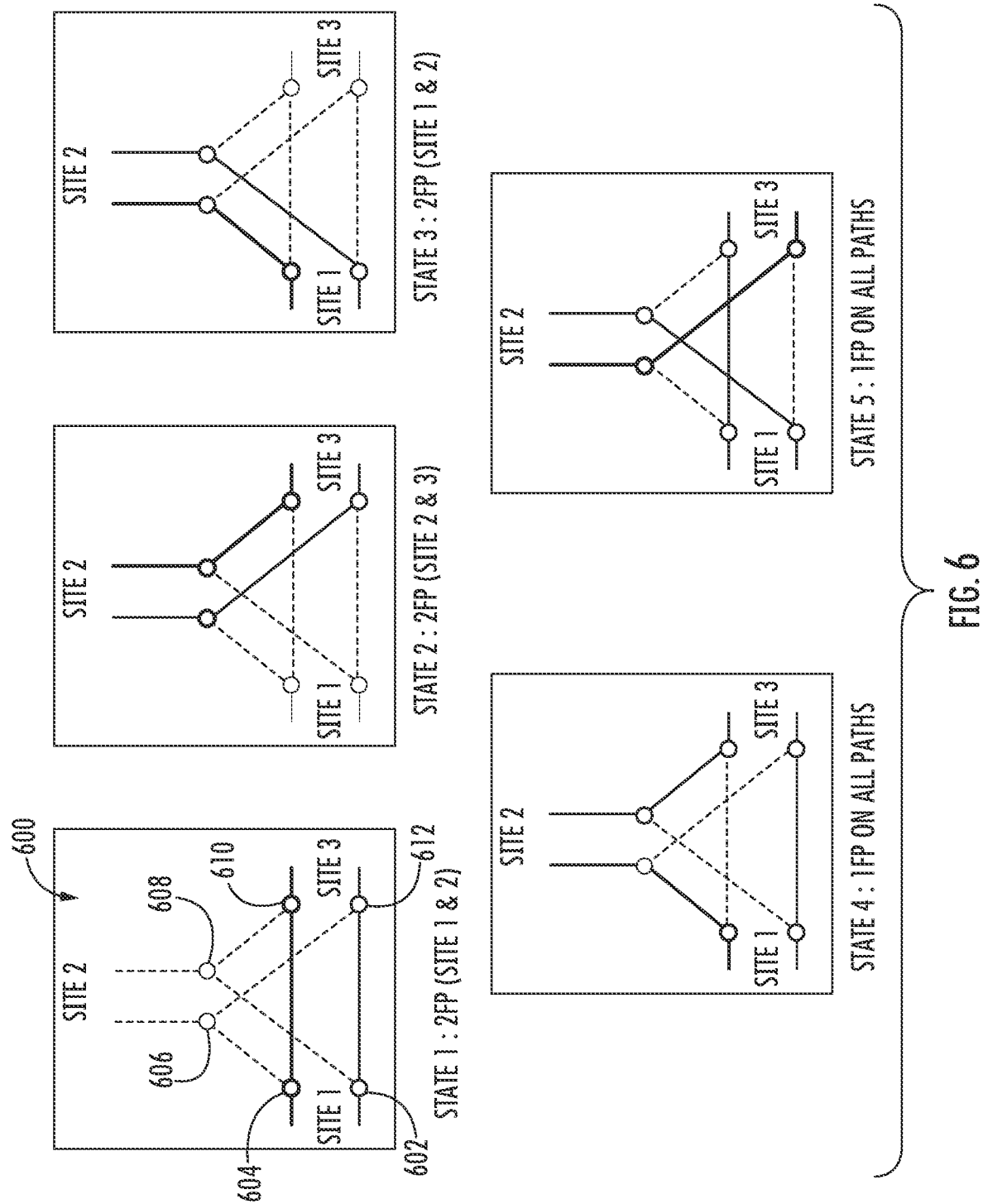
FIG. 6 illustrates states of a branching unit including an example of an additional reconfigurable component coupled to a cable input into an example a branching unit architecture.

FIG. 6 illustrates example states of fiber pairs in a branching unit. In the illustrated example, each site cable is shown for ease of illustration and explanation as providing 2 fiber pairs to a branching unit 600. Each of respective fiber pair includes 2 fibers, an inbound fiber and an outbound fiber. The branching unit 600 is configure with 1 optical assignable switch for each fiber of a fiber pair. In branching unit 600, a first fiber pair in Site 1 couples to two optical assignable switches represented by optical assignable switch 602 and a second fiber pair that couples to another two optical assignable switches represented by optical assignable switch 604. Similarly, a first fiber pair in Site 2 couples to two optical assignable switches represented by optical assignable switch 606 and a second fiber pair that couples to another two optical assignable switches represented by optical assignable switch 608, and a first fiber pair in Site 3 couples to two optical assignable switches represented by optical assignable switch 610 and a second fiber pair that couples to another two optical assignable switches represented by optical assignable switch 612.

A controller (not shown in this example) can, in response to a remote command signal, control the state of fiber pairs designated for routing in the branching unit 600 by sending instructions to respective optical assignable switches for the fiber pairs that are designated for routing. In response to the remote command signal, which then places the branching unit 600.

In State 1, the respective optical assignable switches 602 and 604 of Site 1 in the branching unit 600 are configured to enable the transfer of optical signals from Site 1 to the corresponding optical assignable switches 612 and 610 of Site 3 (as represented by the solid lines). In State 1, the optical pathways between optical assignable switch 602 and optical assignable switch 604 of Site 1 and optical assignable switch 608 and optical assignable switch 606 of Site 2 are inactive (as represented by the dashed lines).

In State 2, the respective optical assignable switches of the branching unit 600 are configured to enable the transfer of optical signals from optical assignable switches 606 and 608 of Site 2 to corresponding optical assignable switches 612 and 610 of Site 2. In State 2, the optical pathways between optical assignable switches 606 and 608 of Site 2 and corresponding optical assignable switches 604 and 602 of Site 1 and the optical pathways between optical assignable switches 602 and 604 of Site 1 and corresponding optical assignable switches 612 and 610 of Site 3 are all shown as inactive (as represented by the dashed lines).

In State 3, the respective optical assignable switches of the branching unit 600 are configured to enable the transfer of optical signals from optical assignable switches 606 and 608 of Site 2 to corresponding optical assignable switches 604 and 602 of Site 1. In State 2, the optical pathways between optical assignable switches 606 and 608 of Site 2 and corresponding optical assignable switches 612 and 610 of Site 3 and the optical pathways between optical assignable switches 602 and 604 of Site 1 and corresponding optical assignable switches 612 and 610 of Site 3 are all shown as inactive (as represented by the dashed lines).

States 1-3 are states in which 2 fiber pairs from a first site are routed to 2 fiber pairs of a second site. However, one of the further improvements and advantages of the disclosed routing architecture and undersea fiber optic cable routing system is a capability to designate and route a first fiber pair from the first site to the second site and a second fiber pair from the first site to a third site. The examples of States 4 and 5 illustrate these advantageous configurations.

In State 4, a first fiber pair of Site 1 coupled to optical assignable switch 602 is routed to a corresponding first fiber pair of Site 3 by coupling to optical assignable switch 612, the second fiber pair of Site 1 coupled to optical assignable switch 604 is routed to a corresponding first fiber pair of Site 2 by coupling to optical assignable switch 606, and a second fiber pair of Site 2 coupled to optical assignable switch 608 is routed to a corresponding second fiber pair of Site 3 by coupling to optical assignable switch 610.

State 5 provides a variation of State 4 that exhibits the flexibility afforded to the controller in designating individual fiber pairs for routing. In State 5, a first fiber pair of Site 1 coupled to optical assignable switch 602 is routed to a corresponding first fiber pair of Site 2 by coupling to optical assignable switch 608, the second fiber pair of Site 1 coupled to optical assignable switch 604 is routed to a corresponding first fiber pair of Site 3 by coupling to optical assignable switch 610, and a second fiber pair of Site 2 coupled to optical assignable switch 606 is routed to a corresponding second fiber pair of Site 3 by coupling to optical assignable switch 612.

The capability to designate routing of individual fiber pairs enables the controller to respond to remote commands that designate any number of individual fiber pairs for routing as a group. For example, groups of 2, 5, 15, 24 up to N, where N is the cable with fewest number of fiber pairs, are possible. Such routing capability improves an optical signal distribution system to respond to changes in demand, equipment failures and outages, and the like, The advantages of the disclosed routing architecture and undersea fiber optic cable routing system shown in and described with respect to the previous examples may be further improved upon by incorporating additional switching capabilities as shown and described in the following examples.

Figure 7:
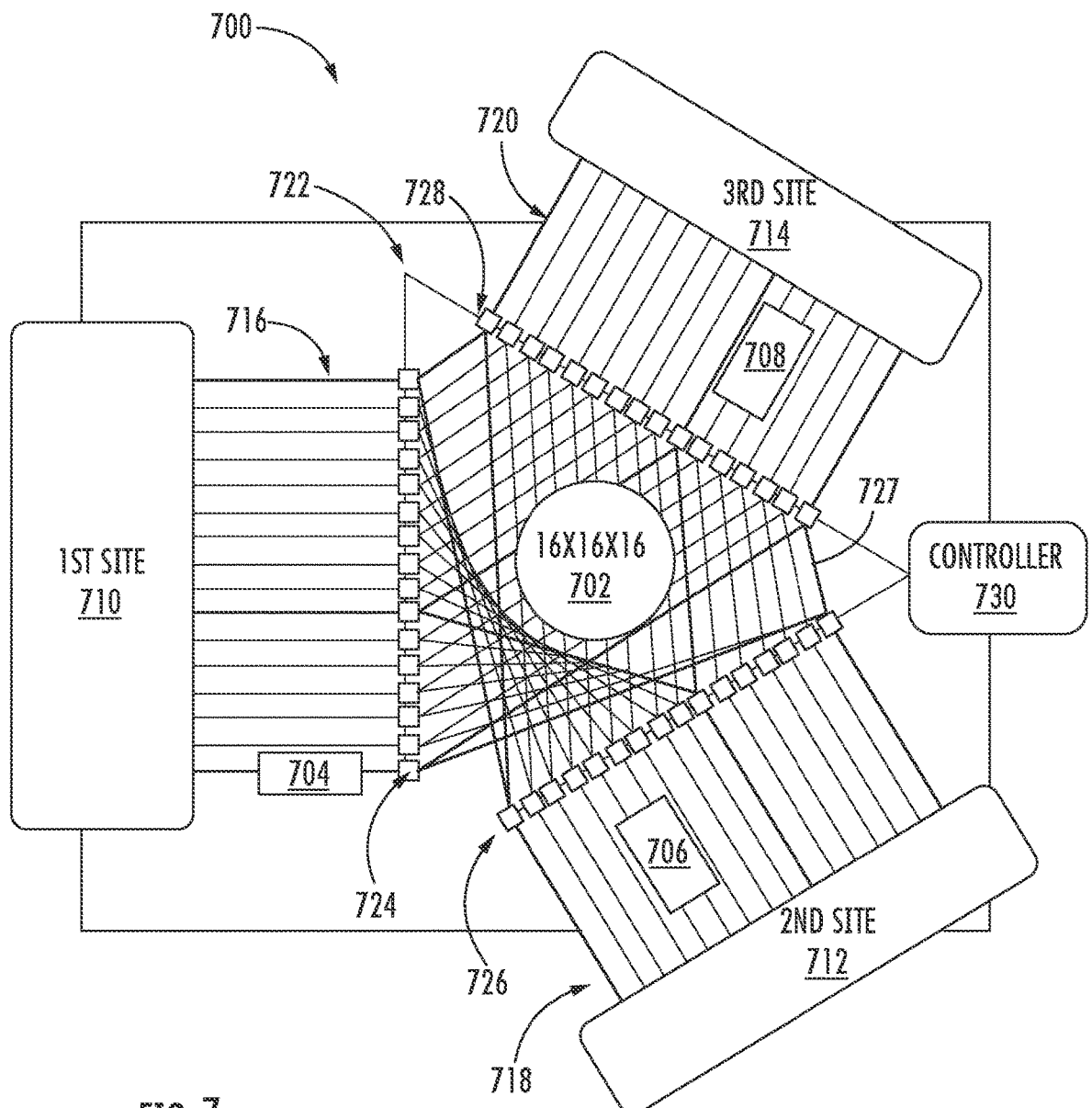
FIG. 7 illustrates another example of a configuration of a branching unit architecture.

FIG. 7 illustrates another example of a configuration of a branching unit that incorporates an additional spectrum routing device.

In the example of FIG. 7, an undersea fiber optic cable routing system 700, includes a first undersea fiber optic cable 716 from $1^{st}$ Site 710, a second undersea fiber optic cable 718 from $2^{nd}$ Site 712, and a third fiber optic cable 720 from $3^{rd}$ Site 714, and a branching unit 722. Each of the first, second and third undersea fiber optic cables 716, 718 and 720 includes a number of fiber pairs. In this example, the number of fiber pairs is 16, but the number of fiber pairs may also be 3, 8, 9 12, 24, or the like.

The branching unit 722 may be configured to couple to each of the first, second and third undersea fiber optic cables 716, 718 and 720 to enable the routing (or "branching") of optical signals from one of the fiber optic cables to another. The branching unit 722 also may include a first set of optical assignable switches 724 configured to optically couple to the number of fiber pairs in the first undersea fiber optic cable 716, a second set of assignable switches 726 configured to optically couple to the number of fiber pairs in the second undersea fiber optic cable 718 and a third set of assignable switches 728 configured to optically couple to the number of fiber pairs in the third undersea fiber optic cable 720. Each assignable switch in the first set of optical assignable switch 724 may be coupled to a respective fiber pair in the first fiber optic cable 716. Similarly, each assignable switch in the second set of assignable switches 726 may be coupled to a respective fiber pair in the second fiber optic cable 718, and each assignable switch in the third set of assignable switches 728 is coupled to a respective fiber pair in the third fiber optic cable 720.

The branching unit 722 also includes a number of optical pathways (represented collectively by 702) that couple respective assignable switches in each of the first set 724, second set 726 and third set of assignable switches 728 to one another.

The controller 730 may be coupled to each respective assignable switch in each of the first set 724 of assignable switches, the second set 726 of assignable switches and the third set 728 of assignable switches. The controller 730 may be operable to assign a respective first set assignable switch from the first set of assignable switches 724 to a respective second set assignable switch in the second set 726 and to a respective third set assignable switch in the third set 728.

In the example system 700, the number of designated fiber pairs for switching may be 16×16×16. The controller 730 may, for example, be operable to assign respective optical assignable switches in the first set of assignable switches 724 to corresponding assignable switches in each of the second set of assignable switches 726 and the third set of assignable switches 728. Based on the assignments given to respective assignable switches in the first set, the second set and the third set, a "switching triangle," such as 727, may be formed.

The optic cable routing system may also include further includes a number of ROADMs 704, 706, and 708 coupled to a selected fiber pair in each of the first (716), second (718) and third (720) undersea fiber optic cables. Each respective reconfigurable optical add-drop multiplexer of the number of reconfigurable optical add-drop multiplexers is coupled to a respective selected fiber pair prior to the respective selected fiber pair coupling to a respective assignable switch. For example, the respective reconfigurable optical add-drop multiplexer 708 is coupled to cable 720 prior to cable 720 coupling to the branching unit 722 and the third set of optical assignable switches 728.

The additional spectrum routing device referenced in the description of FIG. 7 may be a reconfigurable optical add-drop multiplexer (ROADM) that is incorporated prior to the optical assignable switches of a branching unit. As mentioned previously, the undersea fiber optic cables 716, 718 and 720 convey optical signals that are transmitted in different wavelengths of light. Different fibers, such as inbound fibers, in a cable may carry different wavelengths of light. The ROADM is configured to traverse multiple fibers of both types of fibers, where type means an inbound fiber as one type and outbound fiber as another type. The ROADM may be controlled by the controller (shown in other examples) that also controls the branching unit. The ROADM may be configured to combine a first designated set of wavelengths from one input (e.g. a first inbound fiber) with a second designated set of different wavelengths from another input (e.g., a second inbound fiber) in order to allow the first set of designated wavelengths and the second set of designated wavelengths to share an inbound fiber pair. For example, once combined, the combined wavelengths may share the first inbound fiber, the second inbound fiber, or both the first inbound fiber and the second inbound fiber.

In an example that refers to the states of FIG. 6 and the ROADMs. A ROADM, such as 706 may be installed across 2 fiber pairs of cable 718 of $2^{nd}$ site 712. The controller 730 may receive remote command signals designating the 2 fiber pairs couple to the ROADM 706 for switching. The respective 2 fiber pairs coupled to the ROADM 706 may be configured as shown in State 4 of FIG. 6, which enables the controller 730 to direct optical signals in 1 fiber pair of the 2 fiber pairs coupled to the ROADM 706 from $2^{nd}$ Site 712 to $1^{st}$ Site 710. Optical signals in the other 1 fiber pair coupled to the ROADM 706 may be directed to $3^{rd}$ Site 714. A fiber pair in $1^{st}$ Site 710 may be coupled to a fiber pair in 3rd Site 714. The ROADM 706 allows 2 fiber pairs to share the optical wavelength spectrum being transmitted over the 2 fibers pairs to be shared. In instances where the fiber pairs coupled to the ROADM 706 is carrying a greater part of the optical wavelength spectrum from the $2^{nd}$ Site 712, the ROADM 706 may share the spectrum but may also convey a signal to the controller 730 that the state of the fiber pairs should be switched from State 4 (1 FP on all paths) to State 2. In State 2, both fiber pairs coupled to ROADM 706 and respective assignable switches 728 are designated for switching to cope with the greater part of the optical spectrum. In response to the designation for switching, the controller 730 issues control signals to reassign the respective assignable switches in the second set 726 of assignable switches coupled to the 2 fiber pairs to be switched to State 2. By switching to State 2, the shared optical wavelength spectrum is distributed and delivered to the $3^{rd}$ Site. Alternatively, returning to when the respective fiber pairs are configured in State 2, the ROADM 706 may determine from monitoring the respective fiber pair coupled to the ROADM 706 that conveys optical signals to/from the $1^{st}$ Site 710 that fiber pairs from the $1^{st}$ Site 710 are carrying a greater part of the optical wavelength spectrum. As a result, the ROADM may forward this information to the controller 730, which may cause the respective assignable switches of the fiber pair to change to State 1, where the fiber pair from $1^{st}$ Site 710 previously coupled to the ROADM 706 is now switched to couple the one fiber pair from the $1^{st}$ Site 710 to an assignable switch directing the optical signals to the $3^{rd}$ Site 714.

Figure 8:
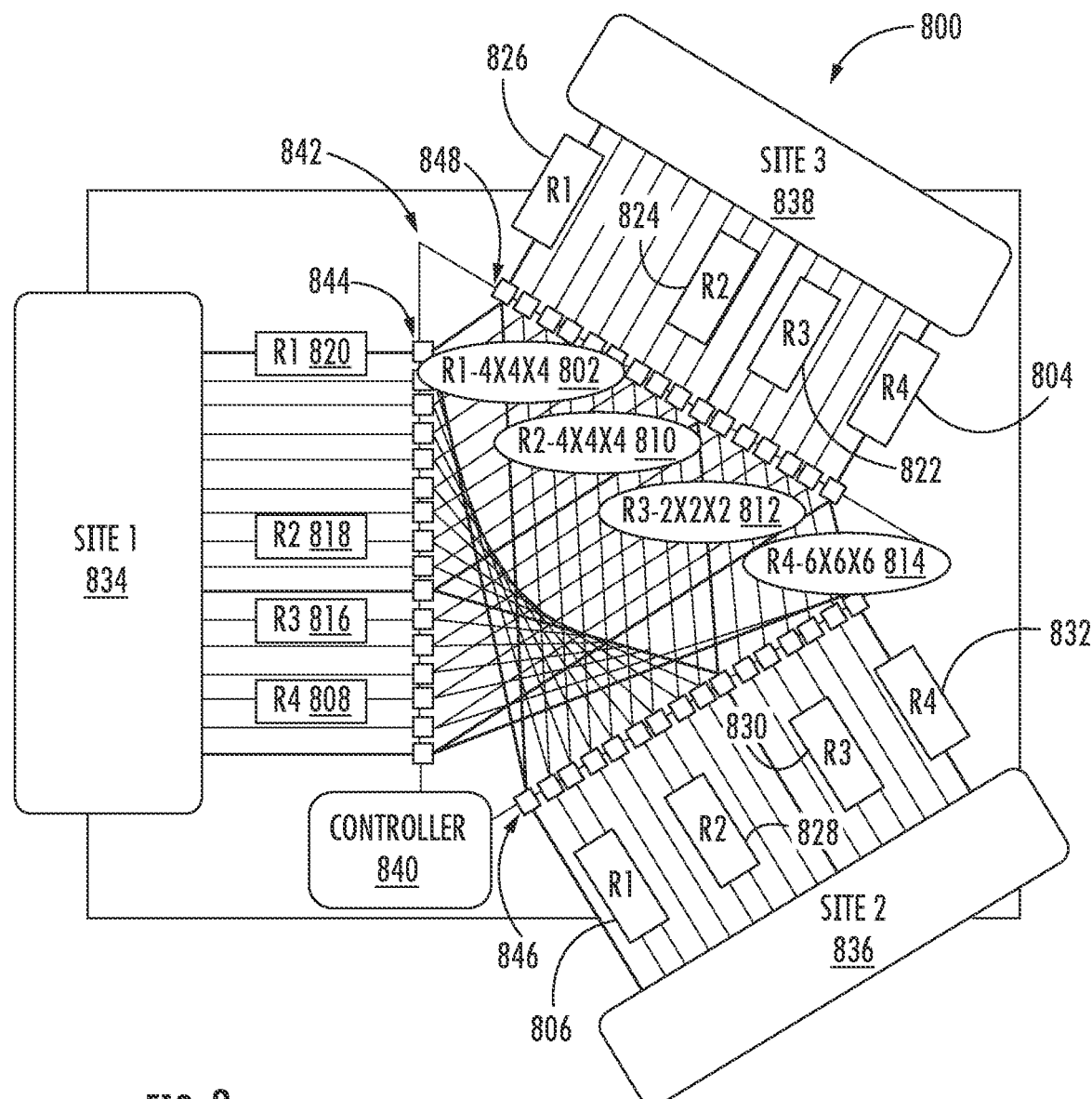
FIG. 8 illustrates yet another example of a configuration of a branching unit architecture.

FIG. 8 illustrates yet another example of a configuration of a branching unit architecture. The configurable branching unit 800 provides an illustration of fiber pair selectivity that enable the concept of anywhere between one "trio" of fiber pairs (e.g. 1×1×1), up to N trios of fiber pairs (e.g., N×N×N), where N is the fiber pair count of the fiber optic cable with the lowest number of fiber pairs.

The configurable branching unit 800 may include three sites (Site 1 834, Site 2 836 and Site 3 838) and from which respective undersea fiber optic cables having a number of fiber pairs couples to a branching unit 842. The number of fiber pairs in each of illustrated cables is 16, but different numbers of fiber pairs may be used. Within, or connected to, the respective undersea fiber optic cables are ROADMs (as described with reference to FIG. 7) coupled to respective fiber pairs. While a ROADM may be typically configured on 2 fiber pairs facing one-out-of-three of the sites, other configurations are envisioned. For example, the cable from Site 1 834 has ROADMS R1 820, R2 818, R3 816 and R4 808 with each ROADM coupled to respective fiber pairs, such as 2 fiber pairs or the like, of the 16 fiber pairs in the cable from Site 1 834. Similarly, the cable from Site 2 836 has ROADMs R1 806, R2 828, R3 830 and R4 834 with each ROADM coupled to respective fiber pairs, such as 2 fiber pairs or the like, of the 16 fiber pairs in the cable from Site 2 836, and the cable from Site 3 8386 has ROADMS R1 826, R2 824, R3 822 and R4 804 with each ROADM coupled to respective fiber pairs, such as 2 fiber pairs or the like, of the 16 fiber pairs in the cable from Site 3 838.

The branching unit 842 is similar to the previously described examples with regard to the number of optical assignable switches and the optical pathways and responsiveness to commands from the controller 840. For example, each cable has respective fiber pairs that are coupled to respective assignable switches of a set of assignable switches from site in the branching unite 842. For example, the fiber pairs from the cable from Site 1 834 couple to the set of assignable switches 844 in the branching unit 842, the fiber pairs from the cable from Site 2 836 couple to the set of assignable switches 846, and the fiber pairs from the cable from Site 3 838 couple to the set of assignable switches 848.

As mentioned with respect to the example of FIG. 7, the controller 840 in the example of FIG. 8 may also determine the state settings of the respective optical assignable switches in the branching unit 842 coupled to each cable of Site 1 834, Site 2 836, and Site 3 838. The controller may be further operable to, in response to remote command signals, group sets of assignable switches together, where each group of assignable switches includes at least one switched coupled to a fiber pair that is also coupled to a ROADM. The controller may set the group state, and the state of each fiber pair may be determined based on the group state. An operational example may be helpful.

In the operational example, the controller 840 may receive designations of fiber pairs to be switched in a remote command signal and which designated fiber pairs are to be grouped together in a trio of groups. In response to the remote command signal, the controller 840 may be operable to subdivide the first set of assignable switches 844 into groups of the first set of assignable switches, subdivide the second set of assignable switches 846 into groups of the second set of assignable switches, where the number of assignable switches in each of the groups of the second state of assignable switches corresponds to the number of assignable switches of the groups of the first set of assignable switches. The controller 840 also subdivides the third set of assignable switches 848 into groups of the third set of assignable switches, where the number of assignable switches in each the groups of the third set of assignable switches corresponds to the number of assignable switches in each of the groups of the first set and the groups of the second set of assignable switches. The controller 840 may be further operable to assign respective groups of the first set of assignable switches to corresponding groups of the second set of assignable switches and the third set of assignable switches.

As shown in FIG. 8, the controller 840 may subdivide the first set of assignable switches into a first group of 4 assignable switches, the assignable switches may include those coupled to a fiber pair in the cable from Site 1 834 that includes ROADM R1 820. The controller may subdivide assignable switches from the second set of assignable switches 846 and third set of assignable switches 848 of assignable switches into groups that include a corresponding group of 4 assignable switches. The controller 840 may place the group of 4 assignable switches from the first set of assignable switches 844, and the corresponding groups of 4 assignable switches from the second set of assignable switches 846 and third set of assignable switches 848 together in a control group, such as R1–4×4×4 802, that control group also includes the respective fiber pairs of each cable coupled to respective ROADMs R1 820, R1 806 and R1 826. Similarly, the controller may generate control groups, such as R2–4×4×4 810 that also includes the respective fiber pairs of each cable coupled to respective ROADMs R2 816, R2 828 and R2 824. The controller may generate control groups with different numbers of assignable switches, such as R3–2×2×2 812, which has groups of 2 assignable switches from each cable, and that includes the respective fiber pairs of each cable coupled to respective ROADMs R3 818, R2 830 and R2 822. Another control group may be R4–6×6×6 814, which has groups of 6 assignable switches from each cable, and that includes the respective fiber pairs of each cable coupled to respective ROADMs R4 808, R4 832 and R8 804.

The generation of control groups may be limited by the number of assignable switches in a group. The group size may be based on the fewest number of fiber pairs in a respective one of the first, second and third undersea fiber optic cables, and each corresponding group may have the same number of assignable switches.

Additionally, further flexibility can be provided in fiber pair routing between the three cables. Groups of more than one fiber pair per cable can be combined in flexible cross-fiber pair routing groups. Switch types other than "one by two" (connecting between one input/output port and two output/input ports) can be used for more complex configurations, such as 2×2 blocking, 2×2 non-blocking, or larger ratio switches.

Alternative optical devices can be used for routing, such as wavelength selector switch filters. Fiber traffic propagation directionality on each fiber can remain the same in all configuration states or can be reversed in some configurations. Configurations can be provided that maintain the coupling of two fibers into one fiber pair for all configurations. Additionally, or alternatively, the assignment of fibers within the cable into fiber pairs could be different in different configuration states. This functionality can be implemented with alternative approaches, including higher order switching, and is not restricted by the architectures shown.

Figure 9:
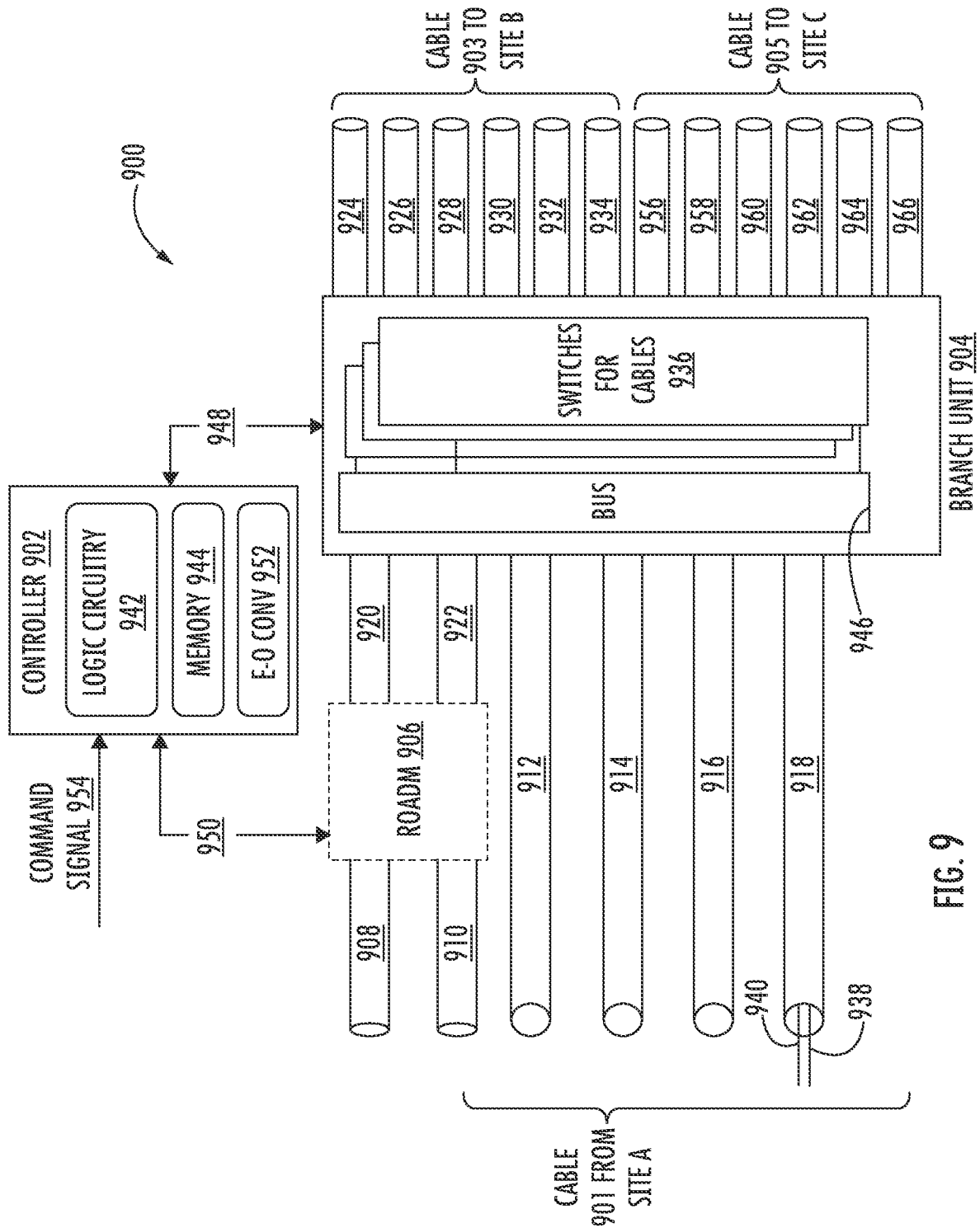
FIG. 9 illustrates an example of a branch unit control configuration in an undersea fiber optic cable routing system.

FIG. 9 illustrates an example of a branch unit control configuration in an undersea fiber optic cable routing system.

The undersea fiber optic cable routing system 900 may include a controller 902 and branching unit 904. The branching unit 904 may be configured to couple to a number of fiber optic cables. The number of fiber optic cables may be three, such as cable 901 from Site A, cable 903 from Site B and cable 905 from Site C. Each fiber optic cable 901, 903 and 905 of the three fiber optic cables may include a number N of fiber pairs, such as 914, 924, and 956, where N is 2, 4, 5, 12, 16, 24 or the like. Note that in the branching unit 904 may be equipped to receive different numbers of fiber pairs in each cable. each fiber pair of the plurality of fiber pairs in the first undersea fiber optic cable 901 includes an outbound fiber, such as 938 for outputting the optical signals from the first site (e.g., Site A) and an inbound fiber 940 that delivers to the optical signals to the first site (i.e., Site A). Likewise, each fiber pair of the plurality of fiber pairs in the second undersea fiber optic cable 903 includes an outbound fiber for outputting the optical signals from the second site (e.g., Site B) and an inbound fiber that delivers to the optical signals to the second site, and each fiber pair of the plurality of fiber pairs in the third undersea fiber optic cable 905 also includes an outbound fiber for outputting the optical signals from the third site (e.g., Site C) and an inbound fiber that delivers to the optical signals to the third site.

Each of the N fiber pairs includes an inbound fiber (e.g., 940) and an outbound fiber (e.g., 938). In an example, the inbound fiber 940 may receive optical information (also referred to as optical signals) from the branching unit and the outbound fiber 938 may deliver different optical information (also referred to as optical signals) to the branching unit 904. In FIG. 9, cable 901 includes the respective fiber pairs are 908, 910, 912, 914, 916 and 918; cable 903 includes respective fiber pairs are 924, 926, 928, 930 932 and 934; and cable 905 includes the respective fiber pairs are 956, 958, 960, 962, 964 and 966.

The branching unit 904 may include a bus 946 and switches 936 for cables. The respective fiber pairs of cables 901, 903 and 905 may couple to respective optical assignable switches 936. Each of the fiber pairs from cables 901, 903 and 905 may include a number of channels in which optical signals are transmitted and one of the channels may be a supervisory channel over which remote command signals may be sent. Bus 946 may be coupled to the respective switches which enables the controller 902 to monitor the supervisory channels and also make switching designations to the respective switches 936 of the respective cables.

The controller 902 may include logic circuitry 942, memory 944 and electro-optical conversion circuitry 952. The controller 902 may receive designations of fiber pairs to be switched in a remote command signal. The controller 902 may be coupled to the bus 946 of the branching unit 904 via a control connection 948 which may be an optical connection or an electrical connection. The control connection 948 enables the logic circuitry 942 to receive remote command signals and send control signals, make switching designations, such as assigning switches to control groups, and configure the assignable switches of the switches 936. The remote command signals may be transmitted on a supervisory channel of a wavelength division multiplexed signal transmitted on the respective selected fiber pair in each of the first, second and third undersea fiber optic cables, The remote command signal may also indicate designated fiber pairs are to be grouped together in a control group, such as group R1–4×4×4 of FIG. 8.

The logic circuitry 942 may be a processor that responds to the remote command signals as well as other signals (such as status queries and the like). The logic circuitry 942 may be implemented with integrated circuits (ICs), application specific ICs (ASICs), field programmable arrays (FPGAs), and/or programmable logic devices (PLDs).

The memory 944 may store programming code executable by the logic circuitry 942 as well as data structures, such as look up tables, usable in configuring the branching unit 904 including the switches 936 as well as the ROADM 906.

The electro-optical conversion circuitry 952 may be operable to convert any optical signals into electrical signals and vice versa. For example, the aforementioned supervisory channel may be an optical channel, and the command signals may be optical signals that are converted to electrical signals compatible with the logic circuitry 942.

The controller 902 may also include a control connection 948 to each respective reconfigurable optical add-drop multiplexer (ROADM) 906, which may be one of many ROADMs used in the system. For example, ROADMs can be added on all or some of the input legs, in order to provide higher granularity optical spectrum allocation between the sites A, B, and C. The control connection 950 enables the controller 902 to control operation of each respective ROADM, such as 906, of a plurality of ROADMs based the remote command signals. Remote command signals (and response signals) may be received by the controller 902 via a dedicated optical frequency within respective fiber pairs of the cables 901, 903 and/or 905 via the bus 946 and control connection 948. In addition, or alternatively, command signal 954 may be received via another cable or transmission method. While ROADM 906 is shown as accessing fiber pairs 908 and 910 from site A and connecting to the branching unit 904 via fiber pairs 920 and 922, ROADMs can be used to access some or all fiber pairs on each leg. For example, multiple ROADMs may be used as shown in FIG. 8 or a single ROADM may be configured to access all of the fiber pairs of a cable.

The controller 902 may be located external to the branching unit 904 or may be internal to the branching unit 904. Similarly, the ROADM 906 may be external to the branching unit 904 or may be internal to the branching unit 904.

The architecture described herein can be used throughout bidirectional fiber pairs for two-way communications traffic. In alternate embodiments, it can also be used on a single fiber basis and other applications such as one-way data retrieval from undersea scientific applications or sensors.

Certain examples of the present disclosure were described above. It is, however, expressly noted that the present disclosure is not limited to those examples, but rather the intention is that additions and modifications to what was expressly described herein are also included within the scope of the disclosed examples. Moreover, it is to be understood that the features of the various examples described herein were not mutually exclusive and may exist in various combinations and permutations, even if such combinations or permutations were not made express herein, without departing from the spirit and scope of the disclosed examples. In fact, variations, modifications, and other implementations of what was described herein will occur to those of ordinary skill in the art without departing from the spirit and the scope of the disclosed examples. As such, the disclosed examples are not to be defined only by the preceding illustrative description.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, various features are grouped together in a single example for streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels and are not intended to impose numerical requirements on their objects.

The foregoing description of examples has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

What is claimed is:

1. A computer-implemented method, comprising:
    selecting, using at least one processor, one or more fiber pairs in a plurality of fiber pairs in one or more undersea cables for routing of at least one transmission, the one or more undersea cables connecting one or more transmission sites;
    assigning, using the at least one processor, one or more optical switches to each selected fiber pair in the selected one or more fiber pairs;
    forming, using the at least one processor, one or more dedicated optical pathways using the selected one or more fiber pairs and the assigned one or more optical switches; and
    transmitting, using the at least one processor, the at least one transmission using the formed one or more dedicated optical pathways between the one or more transmission sites.

2. The method according to claim 1, wherein the selecting includes receiving a remote command identifying the one or more fiber pairs for routing of the at least one transmission.

3. The method according to claim 1, wherein the one or more transmission sites include a first transmission site, a second transmission site and a third transmission site.

4. The method according to claim 3, wherein a branching unit is configured to be connected to the first transmission site, the second transmission site and the third transmission site, the branching unit includes the one or more optical switches.

5. The method according to claim 4, wherein the one or more undersea cables include
    one or more first undersea cables connected to the first transmission site and the branching unit, and includes one or more first fiber pairs in the plurality of fiber pairs connected to one or more optical switches of the branching unit,
    one or more second undersea cables connected to the second transmission site and the branching unit, and includes one or more second fiber pairs in the plurality of fiber pairs connected to one or more optical switches of the branching unit, and
    one or more third undersea cables connected to the third transmission site and the branching unit, and includes one or more third fiber pairs in the plurality of fiber pairs connected to one or more optical switches of the branching unit.

6. The method according to claim 5, wherein the selecting includes selecting two fiber pairs in each undersea cable in the one or more undersea cables for routing of the at least one transmission.

7. The method according to claim 6, wherein the selecting includes selecting
    a first fiber pair and a second fiber pair in the plurality of fiber pairs in the one or more first undersea cables,
    a third fiber pair and a fourth fiber pair in the plurality of fiber pairs in the one or more second undersea cables, and
    a fifth fiber pair and a sixth fiber pair in the plurality of fiber pairs in the one or more third undersea cables,
    for routing of the at least one transmission.

8. The method according to claim 7, wherein the assigning further comprises assigning
    a first optical switch and a second optical switch in the one or more optical switches to the first and second fiber pair,
    a third optical switch and a fourth optical switch in the one or more optical switches to the third and fourth fiber pair, and
    a fifth optical switch and a sixth optical switch in the one or more optical switches to the fifth and sixth fiber pair,
    for routing of the at least one transmission.

9. The method according to claim 8, wherein the one or more dedicated optical pathways include at least one optical pathway between at least one pair of at least one of the first, second, third, fourth, fifth and sixth switches.

10. The method according to claim 1, wherein the transmitting including connecting at least two transmission sites in the one or more transmission sites using the one or more dedicated optical pathways, while at least one transmission site in the one or more transmission sites is disconnected.

11. A system, comprising:
a branching unit configured to be connected to one or more transmission sites, the branching unit including one or more optical switches;
at least one controller communicatively coupled to the branching unit and including
at least one processor; and
at least one non-transitory storage media storing instructions, that when executed by the at least one processor, cause the at least one processor to perform operations including
selecting one or more fiber pairs in a plurality of fiber pairs in one or more undersea cables for routing of at least one transmission, the one or more undersea cables connecting the one or more transmission sites;
assigning the one or more optical switches to each selected fiber pair in the selected one or more fiber pairs;
forming one or more dedicated optical pathways using the selected one or more fiber pairs and the assigned one or more optical switches; and
transmitting the at least one transmission using the formed one or more dedicated optical pathways between the one or more transmission sites.

12. The system according to claim 11, wherein the selecting includes receiving a remote command identifying the one or more fiber pairs for routing of the at least one transmission.

13. The system according to claim 11, wherein the one or more transmission sites include a first transmission site, a second transmission site and a third transmission site.

14. The system according to claim 13, wherein the one or more undersea cables include
one or more first undersea cables connected to the first transmission site and the branching unit, and includes one or more first fiber pairs in the plurality of fiber pairs connected to one or more optical switches of the branching unit,
one or more second undersea cables connected to the second transmission site and the branching unit, and includes one or more second fiber pairs in the plurality of fiber pairs connected to one or more optical switches of the branching unit, and
one or more third undersea cables connected to the third transmission site and the branching unit, and includes one or more third fiber pairs in the plurality of fiber pairs connected to one or more optical switches of the branching unit.

15. The system according to claim 14, wherein the selecting includes selecting two fiber pairs in each undersea cable in the one or more undersea cables for routing of the at least one transmission.

16. The system according to claim 15, wherein the selecting includes selecting
a first fiber pair and a second fiber pair in the plurality of fiber pairs in the one or more first undersea cables,
a third fiber pair and a fourth fiber pair in the plurality of fiber pairs in the one or more second undersea cables, and
a fifth fiber pair and a sixth fiber pair in the plurality of fiber pairs in the one or more third undersea cables,
for routing of the at least one transmission.

17. The system according to claim 16, wherein the assigning further comprises assigning
a first optical switch and a second optical switch in the one or more optical switches to the first and second fiber pair,
a third optical switch and a fourth optical switch in the one or more optical switches to the third and fourth fiber pair, and
a fifth optical switch and a sixth optical switch in the one or more optical switches to the fifth and sixth fiber pair,
for routing of the at least one transmission.

18. The system according to claim 17, wherein the one or more dedicated optical pathways include at least one optical pathway between at least one pair of at least one of the first, second, third, fourth, fifth and sixth switches.

19. The system according to claim 11, wherein the transmitting including connecting at least two transmission sites in the one or more transmission sites using the one or more dedicated optical pathways, while at least one transmission site in the one or more transmission sites is disconnected.

20. A computer program product comprising a non-transitory machine-readable medium storing instructions that, when executed by at least one programmable processor, cause the at least one programmable processor to perform operations comprising:
selecting one or more fiber pairs in a plurality of fiber pairs in one or more undersea cables for routing of at least one transmission, the one or more undersea cables connecting one or more transmission sites;
assigning one or more optical switches to each selected fiber pair in the selected one or more fiber pairs;
forming one or more dedicated optical pathways using the selected one or more fiber pairs and the assigned one or more optical switches; and
transmitting the at least one transmission using the formed one or more dedicated optical pathways between the one or more transmission sites.

\* \* \* \* \*